United States Patent
Zheng

(10) Patent No.: US 9,250,485 B1
(45) Date of Patent: Feb. 2, 2016

(54) LIQUID CRYSTAL DISPLAY PANEL AND ARRAY SUBSTRATE THEREOF WHEREIN A WIDTH OF BAR-SHAPED GAPS IN EACH OF A PLURALITY OF PIXEL UNITS INCREASES GRADUALLY

(71) Applicant: Shenzhen China Star Optoelectronics Technology Co., Ltd., Shenzhen, Guangdong (CN)

(72) Inventor: Hua Zheng, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/401,520

(22) PCT Filed: Oct. 17, 2014

(86) PCT No.: PCT/CN2014/088844
§ 371 (c)(1),
(2) Date: Nov. 15, 2014

(30) Foreign Application Priority Data

Oct. 14, 2014 (CN) .......................... 2014 1 05421168

(51) Int. Cl.
*G02F 1/1337* (2006.01)
*G02F 1/1343* (2006.01)
*G02F 1/1368* (2006.01)

(52) U.S. Cl.
CPC ........ *G02F 1/134336* (2013.01); *G02F 1/1368* (2013.01); *G02F 1/13439* (2013.01)

(58) Field of Classification Search
CPC .......... G02F 1/134336; G02F 1/13439; G02F 1/1368
USPC .................................................. 349/130, 141
See application file for complete search history.

(56) References Cited

U.S. PATENT DOCUMENTS

| | | | | |
|---|---|---|---|---|
| 2012/0075562 A1* | 3/2012 | Yeh | ....................... | G02F 1/1323 349/139 |
| 2012/0314173 A1* | 12/2012 | Zhang | ................ | G02F 1/133707 349/143 |
| 2013/0003004 A1* | 1/2013 | Shimizu | ................... | G02F 1/139 349/130 |
| 2013/0010248 A1* | 1/2013 | Kang | ................. | G02F 1/133707 349/139 |
| 2013/0057813 A1* | 3/2013 | Jeong | ................. | G02F 1/134309 349/110 |

\* cited by examiner

*Primary Examiner* — Paul Lee
(74) *Attorney, Agent, or Firm* — Andrew C. Cheng

(57) ABSTRACT

The present invention provides a liquid crystal display (LCD) panel and an array substrate thereof. The LCD panel includes a number of pixel units, each of the pixel units includes a pixel electrode, and each pixel electrode includes a number of bar-shaped gaps and a number of first electrode patterns. The bar-shaped gaps and the first electrode patterns are alternatively arranged. In the number of the pixel units, the sum of the area of the bar-shaped gaps in each of the pixel units increases gradually along a direction from a middle region of the LCD panel to side regions of the LCD panel, while the sum of the area of the first electrode patterns in each of the pixel units is same. By using the above means, the LCD panel of the present invention obtains better brightness uniformity, and "white sides" phenomenon is alleviated or even eliminated.

19 Claims, 3 Drawing Sheets

LIQUID CRYSTAL DISPLAY PANEL AND ARRAY SUBSTRATE THEREOF WHEREIN A WIDTH OF BAR-SHAPED GAPS IN EACH OF A PLURALITY OF PIXEL UNITS INCREASES GRADUALLY

TECHNICAL FIELD

The present invention relates to liquid crystal display technology, and more particularly to a liquid crystal display panel and an array substrate thereof.

BACKGROUND

When a thin film transistor liquid crystal display (TFT-LCD) panel displays at a low gray level, an undesirable phenomenon usually called "white sides", which causes two side areas of the panel having higher brightness, while a middle area thereof having lower brightness, easily occurs.

The "white sides" phenomenon is produced due to the following mechanisms. As shown in FIG. 1, the driving voltage of gate lines 11 is inputted by gate driving electrodes 12, which are disposed at left and right sides of a LCD panel 11. Due to the resistance and capacitance (RC) delay of the gate lines 11, the normal gate driving voltage inputted from the two sides distorts when transmitted to a middle area A. That is, the wave shape of the gate driving voltage distorts, and the distorted gate driving voltage reduces a recharging rate of the middle area A. Accordingly, the brightness of the middle area A is reduced. Relatively, two side areas B1 and b2 look brighter compared with the middle area A. In other words, the "white sides" phenomenon occurs. When the LCD panel displays at a low gray level, the human eyes are more sensitive and thus the "white sides" phenomenon is especially obvious.

SUMMARY

In view of above description, the present invention provides a liquid crystal display panel and an array substrate thereof, which are capable of enabling LCD panel to have uniform brightness, and decreasing or eliminating the "white sides" phenomenon.

To solve the technical problem, a LCD panel is provided according to one aspect of the present invention. The LCD panel includes a number of pixel units, each of the pixel units includes a pixel electrode, and each pixel electrode includes a number of bar-shaped gaps and a number of first electrode patterns. The bar-shaped gaps and the first electrode patterns are alternatively arranged. In the number of the pixel units, the sum of the area of the bar-shaped gaps in each of the pixel units increases gradually along a direction from a middle region of the LCD panel to side regions of the LCD panel, while the sum of the area of the first electrode patterns in each of the pixel units is same. Along the direction from the middle region of the LCD panel to the side regions of the LCD panel, the width of the bar-shaped gaps in each of the pixel units increases gradually, the width of the first electrode patterns is same, and the sum of the width of the first electrode patterns and the bar-shaped gaps increase gradually. The pixel units are further electrically connected to gate lines and data lines. The pixel units further include a thin-film transistor for driving the pixel electrode. A gate electrode, a source electrode and a drain electrode of the thin film transistor are electrically connected to a gate line, a data line and a pixel electrode, respectively. The LCD panel further includes a gate driver and a source driver. The gate driver is connected to the gate lines for providing scanning voltage to the number of pixel units, and the source driver is connected to the data lines for providing driving voltage to the number of pixel units.

Each of the pixel electrodes includes a first region, a second region, a third region and a fourth region. The first region and the second region are juxtaposed with each other, the first region and the fourth region are disposed at diagonal corners of the pixel electrode, and the second region and the third region are disposed at diagonal corners of the pixel electrode.

The first electrode patterns in the first region and the first electrode patterns in the fourth electrode patterns extend along a same direction, the first electrode patterns in the second region and the first electrode patterns in the third electrode patterns extend along a same direction.

The first electrode patterns in the first region and the first electrode patterns in the fourth electrode patterns extend along a first direction, the first electrode patterns in the second region and the first electrode patterns in the third electrode patterns extend along a second direction. The first direction is perpendicular to the second direction.

Each of the pixel electrodes further includes second electrode patterns and third electrode patterns. The second electrode patterns are arranged surrounding the first region, the second region, the third region and the fourth region. The third electrode patterns are configured for defining the first region, the second region, the third region and the fourth region.

To solve the technical problem, another LCD panel is provided according to another aspect of the present invention. The LCD panel includes a number of pixel units. Each of the pixel units includes a pixel electrode. Each pixel electrode includes a number of bar-shaped gaps and a number of bar-shaped first electrode patterns. The bar-shaped gaps and the bar-shaped first electrode patterns are alternatively arranged. In the number of the pixel units, the sum of the area of the bar-shaped gaps in each of the pixel units increases gradually along a direction from a middle region of the LCD panel to side regions of the LCD panel, while the sum of the area of the first electrode patterns in each of the pixel units is same.

Along the direction from the middle region of the LCD panel to the side regions of the LCD panel, the width of the bar-shaped gaps in each of the pixel units increases gradually, the width of the first electrode patterns is same, and the sum of the width of the first electrode patterns and the bar-shaped gaps increase gradually.

Each of the pixel electrodes includes a first region, a second region, a third region and a fourth region. The first region and the second region are juxtaposed with each other, the first region and the fourth region are disposed at diagonal corners of the pixel electrode, and the second region and the third region are disposed at diagonal corners of the pixel electrode.

The first electrode patterns in the first region and the first electrode patterns in the fourth electrode patterns extend along a same direction, the first electrode patterns in the second region and the first electrode patterns in the third electrode patterns extend along a same direction.

The first electrode patterns in the first region and the first electrode patterns in the fourth electrode patterns extend along a first direction, the first electrode patterns in the second region and the first electrode patterns in the third electrode patterns extend along a second direction. The first direction is perpendicular to the second direction.

Each of the pixel electrodes further includes second electrode patterns and third electrode patterns. The second electrode patterns are arranged surrounding the first region, the second region, the third region and the fourth region. The third electrode patterns are configured for defining the first region, the second region, the third region and the fourth region.

The pixel units are further electrically connected to gate lines and data lines. The pixel units further include a thin-film transistor for driving the pixel electrode. A gate electrode, a source electrode and a drain electrode of the thin film transistor are electrically connected to a gate line, a data line and a pixel electrode, respectively.

The LCD panel further includes a gate driver and a source driver. The gate driver is connected to the gate lines for providing scanning voltage to the number of pixel units, and the source driver is connected to the data lines for providing driving voltage to the number of pixel units.

To solve the technical problem, an array substrate for an LCD panel is provided according to still another aspect of the present invention. The array substrate includes a number of pixel units. Each of the pixel units includes a pixel electrode. Each pixel electrode includes a number of bar-shaped gaps and a number of bar-shaped first electrode patterns. The bar-shaped gaps and the bar-shaped first electrode patterns are alternatively arranged. In the number of the pixel units, the sum of the area of the bar-shaped gaps in each of the pixel units increases gradually along a direction from a middle region of the LCD panel to side regions of the LCD panel, while the sum of the area of the first electrode patterns in each of the pixel units is same.

Along the direction from the middle region of the LCD panel to the side regions of the LCD panel, the width of the bar-shaped gaps in each of the pixel units increases gradually, the width of the first electrode patterns is same, and the sum of the width of the first electrode patterns and the bar-shaped gaps increase gradually.

Each of the pixel electrodes includes a first region, a second region, a third region and a fourth region. The first region and the second region are juxtaposed with each other, the first region and the fourth region are disposed at diagonal corners of the pixel electrode, and the second region and the third region are disposed at diagonal corners of the pixel electrode.

The first electrode patterns in the first region and the first electrode patterns in the fourth electrode patterns extend along a same direction, the first electrode patterns in the second region and the first electrode patterns in the third electrode patterns extend along a same direction.

The first electrode patterns in the first region and the first electrode patterns in the fourth electrode patterns extend along a first direction, the first electrode patterns in the second region and the first electrode patterns in the third electrode patterns extend along a second direction. The first direction is perpendicular to the second direction.

Each of the pixel electrodes further includes second electrode patterns and third electrode patterns. The second electrode patterns are arranged surrounding the first region, the second region, the third region and the fourth region. The third electrode patterns are configured for defining the first region, the second region, the third region and the fourth region.

By implementing the above technical solutions, following advantages of embodiments of the present invention are achieved. In the above embodiments, the sum of the area of the bar-shaped gaps in each of the pixel units increases gradually along a direction from a middle region of the LCD panel to side regions of the LCD panel, while the sum of the area of the first electrode patterns in each of the pixel units is same. As a result, the efficiency of liquid crystals in the side regions is reduced, and a light transmittance rate of the side regions is also reduced. Accordingly, the brightness in the side regions is reduced. Thus, the brightness difference of the sides regions and the middle region is decreased or eliminated. The LCD panel obtains better brightness uniformity, and the "white sides" phenomenon is alleviated or even eliminated.

DETAILED DESCRIPTION OF PREFERRED EMBODIMENTS

Technical solutions of embodiments of the present invention will be clearly and fully described with reference to figures as follows. Obviously, the embodiments of the present invention described below are only a portion of, but not all the embodiments. Based upon the embodiments of the present invention, all the other embodiments obtained without creative work by those ordinarily skilled in the art should be included in the scope of the present invention.

Figure 1:
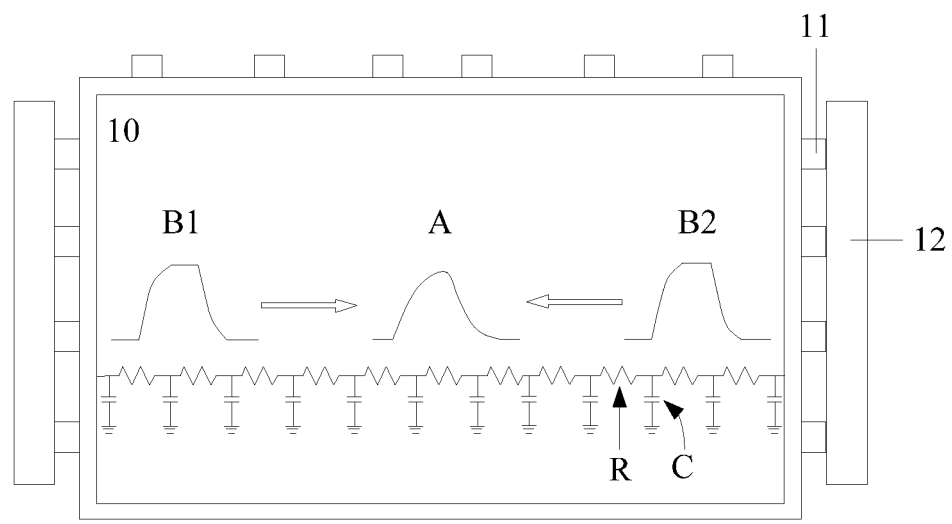
FIG. 1 is a top view of a LCD panel in the known art.
Figure 2:
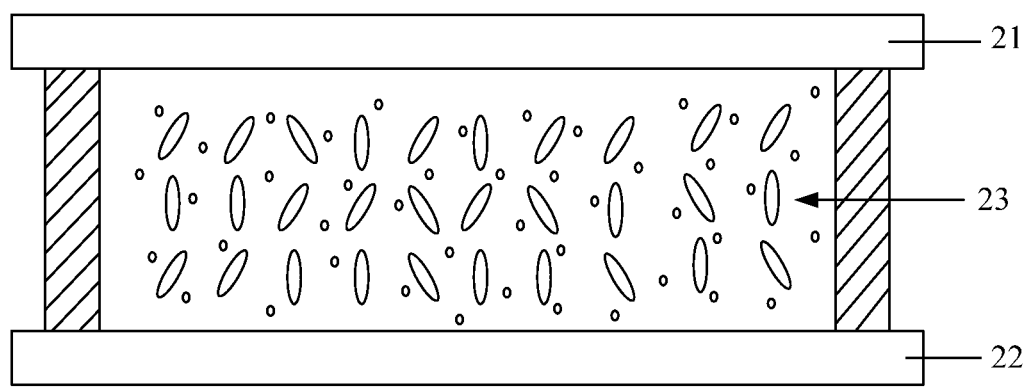
FIG. 2 is a cross sectional view of a LCD panel according to a preferred embodiment of the present invention.
Figure 3:
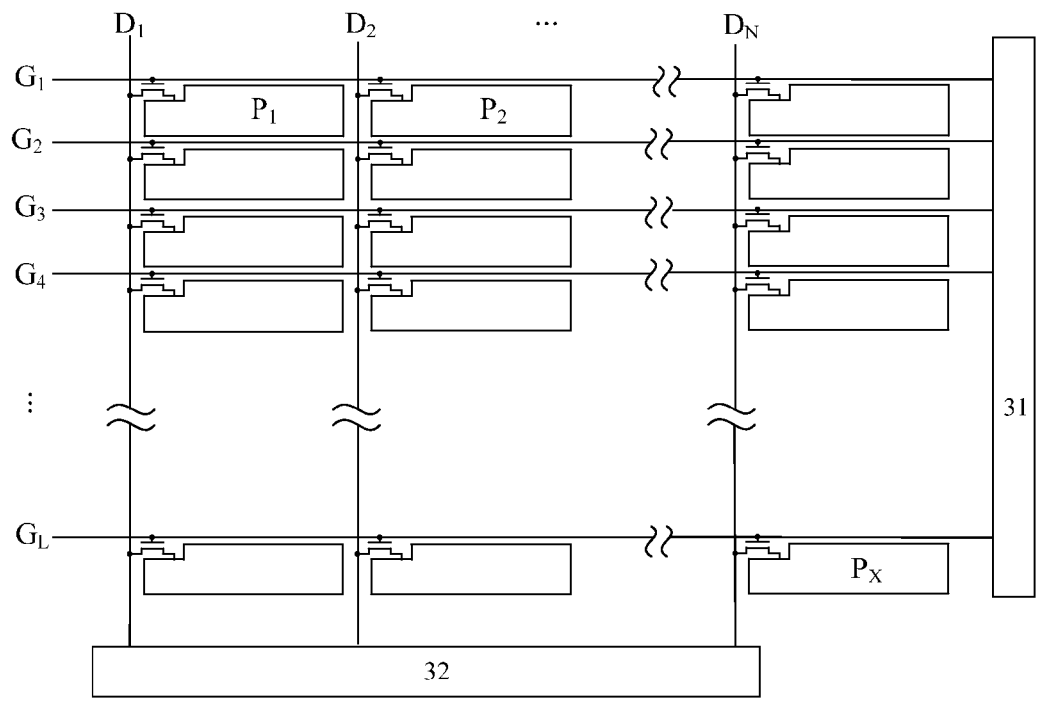
FIG. 3 is a top view of the LCD panel according to the preferred embodiment of the present invention.
Figure 4:
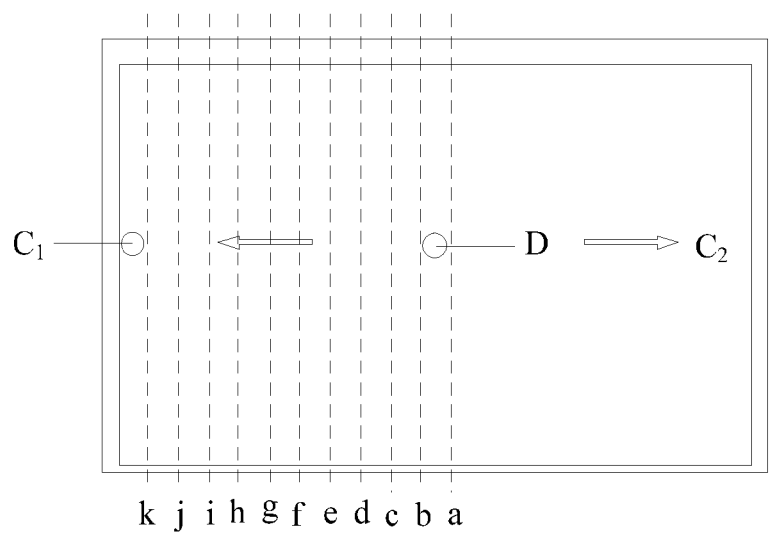
FIG. 4 is a schematic view illustrating pixel structure of the LCD panel according to the preferred embodiment of the present invention.

FIG. 2 and FIG. 3 are cross sectional view and top view of a LCD panel according to a preferred embodiment of the present invention, respectively. FIG. 4 is a schematic view illustrating pixel structure of the LCD panel. Referring to FIGS. 2 through 4, a LCD panel 20 includes a first substrate 21, a second substrate 22 and a liquid crystal layer 23. The first substrate 21 and the second subtracted are opposite to each other and spaced apart from each other. The second substrate 22 is a color filter substrate, and the first substrate 21 is a thin film transistor array substrate. The first substrate 21 includes a transparent substrate and various lines and pixel electrodes disposed on the transparent substrate.

In detail, the first substrate 21 includes a number of data lines D1, D2, . . . , DN, a number of gate lines G1, G2, . . . , GL arranged along a direction perpendicular to the data lines, and a number of pixel units P1, P2, . . . , PX defined by the number of gate lines G1, G2, . . . , GL and the number of data lines D1, D2, . . . , DN. Each of the pixel units is electrically connected to a corresponding gate line and a corresponding data line.

The number of gate lines G1, G2, . . . , GL are connected to a gate driver 31, the number of data lines D1, D2, . . . , DN are connected to a source driver 32. The gate driver 31 is configured for providing scanning voltage to the number pixel units P1, P2, . . . , PX, the source driver 32 is configured for providing driving voltage to the number of pixel units P1, P2, . . . , PX.

Figures 5, 6:
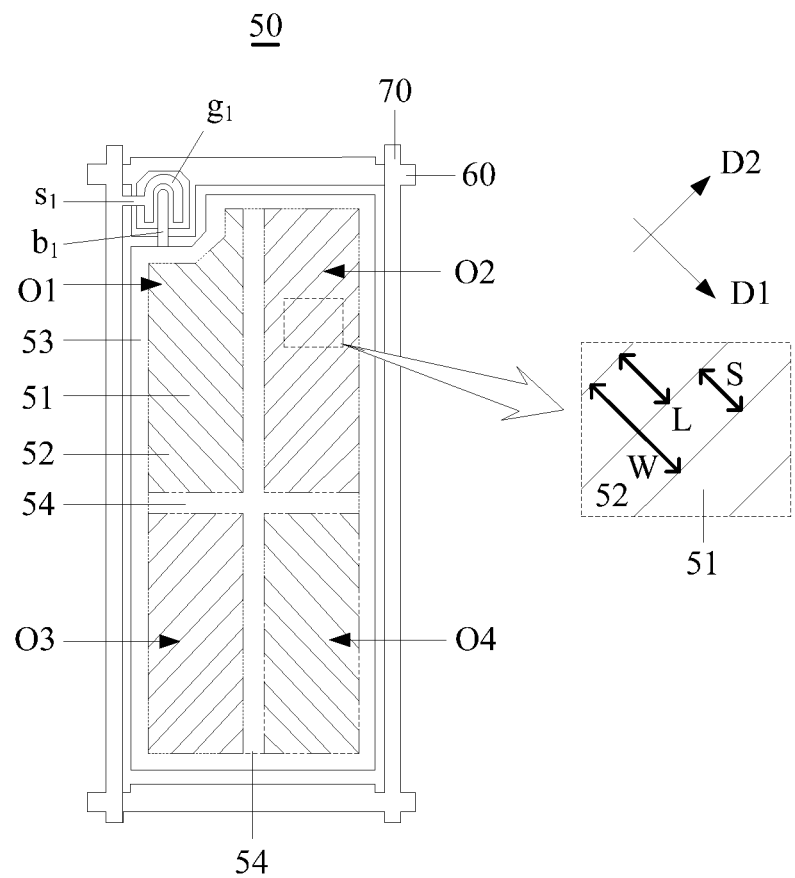
FIG. 5 is a schematic view illustrating a pixel unit of the LCD panel shown in FIG. 3.
FIG. 6 is a schematic view illustrating a correspondence between the aperture ratio and the length of the pixel electrode of the LCD panel shown in FIG. 3.

FIG. 5 is a schematic view illustrating a pixel unit of the LCD panel 20 shown in FIG. 3. Referring together with FIG. 5, the LCD panel 20 includes a number pixel units $P_1$, $P_2$, . . . , $P_X$, arranged in a matrix. Each of the pixel unit includes a pixel electrode, each pixel electrode is connected to a corresponding gate line and a corresponding data line, for example, a gate line 60 and a gate line 70 of a pixel unit 50 as shown in FIG. 5. Each pixel electrode includes a number of bar-shaped first electrode patterns 51, a number of indium tin oxide (ITO) gaps 52, a second electrode pattern 53 and a third electrode pattern 54.

The second electrode pattern 53 is configured for defining the aperture area of the pixel unit 50. Two bar-shaped third electrode patterns 54 are perpendicular to each other as a cross, and are configured for dividing each pixel electrode into a first region O1, a second region O2, a third region O3 and a fourth region O4. The bar-shaped second electrode pattern 53 surrounds and encloses the first region O1, the second region O2, the third region O3, and the fourth region O4, and defines a rectangular shape of the pixel unit 50.

In the present embodiment, the first region O1 at the top left corner and the second region O2 at the top right corner are juxtaposed along a horizontal direction, the fourth region O4 and the first region O1 are arranged at diagonal corners. The third region O3 at the bottom left corner and the second region O2 are arranged at diagonal corners, and the electrode patterns in the first region O1 and the fourth region O4 extends in a same direction, such as a first direction D1 as shown in the figure. The electrode patterns in the second region O2 and the third region O3 extends in a same direction, such as a second direction D2 as shown in the figure. The first direction D1 is perpendicular to the second direction D2. The first direction D1, for example, is at an angle of 135° with the positive horizontal direction. The second direction, for example, is at an angle of 45° with the positive horizontal direction. The positive horizontal direction represents a direction from the first region O1 to the second region O2 or from the third region O3 to the fourth region O4, and the position horizontal direction is parallel to the gate line 60.

In each pixel unit 50, the width L of the first electrode patterns 51 of each pixel electrode is same, and the width S of the gaps 52 of each pixel electrode is same. That is, the width L of the first electrode patterns 51 and the width S of the gaps 52 of a same pixel electrode are same. In addition, the number of bar-shaped gaps 52 and the number bar-shaped first electrode patterns 51 are arranged alternatively on a plane of the pixel electrode.

A primary objective of the present embodiment is to obtain a distribution of the number of pixel units $P_1, P_2, \ldots, P_X$ that the sum of the area of the bar-shaped gaps 52 in each of the pixel units 50 increases gradually, along a direction from a middle area D to side areas C1, C2 of the LCD panel 20, or namely a direction as indicated by an arrow shown in FIG. 4. Specifically, the width S of the bar-shaped gaps 52 in different pixel units 50 increases gradually. The width L of the first electrode patterns 51 in different pixel units 50 is the same, and more preferably, the sum of the width L is the same as the width sum in the known art. Accordingly, the sum W of the width L of the first electrode patterns 51 and the width S of the bar-shaped gaps 52 in different pixel units increases gradually.

A light transmittance ratio of a pixel unit is calculated by the following formula: light transmittance ratio=aperture ratio*liquid crystal efficiency (light transmittance ratio of a unit area). As commonly known in the art of liquid display technology, the bar-shaped gaps 52 is only helpful for the liquid crystals corresponding to the first electrode patterns 51 incline to a pretilt angle, but is not helpful for the light transmittance ratio. Thus, by increasing the width S of the bar-shaped gaps 52 in the pixel electrode and keeping the width L of the first electrode pattern 51 between adjacent bar-shaped gaps 52 unchanged, the liquid crystal efficiency of the area corresponding to the pixel unit 50 could be decreased, thereby reducing the light transmittance ratio of the pixel units 50 in the side regions $C_1$ and $C_2$. Accordingly, the brightness of the side regions C1 and C2 is also reduced. Thus, the brightness difference of the sides regions C1, C2 and the middle region D is decreased or even eliminated. The LCD panel 20 obtains better brightness uniformity, and the "white sides" phenomenon is alleviated or even eliminated.

To achieve the above objective, the number of pixel units $P_1, P_2, \ldots, P_X$ have different structures. In the present embodiment, taking a pixel unit in the middle region D of the LCD panel 20 and a pixel unit in the side region ($C_1$) of the LCD panel as examples, the structure of the pixel units is described as follows. Referring to FIGS. 4 and 5, the width of the first electrode pattern 51 of the pixel unit 50 in the side region $C_1$ is defined as $L_C$, and the width of the gap is defined as $S_C$, the width of the first electrode pattern 51 of the pixel unit 50 in the middle region D is defined as $L_D$, and the width of the gap is defined as $S_D$, then $L_C=L_D$, $S_C>S_D$, and $L_C+S_C>L_D+S_D$.

Besides, in a preferred manner, width difference of the bar-shaped gaps 52 of pixel electrodes in any two adjacent pixel units 50 is the same along a direction from the middle region D to the side regions $C_1$, $C_2$. In other words, the width of the bar-shaped gaps 52 in the number of pixel units $P_1$, $P_2, \ldots, P_X$ varies in a same interval gradually, as described in the following examples.

Referring to FIGS. 4 and 5, eleven adjacent regions a, b, c, d, e, f, g, h, i, j, k are selected along the direction from the middle region D to the side regions C, C2. Assuming that the width of the bar-shaped gaps 52 of a corresponding pixel electrode in the region a is 6.0, then the width of the bar-shaped gaps 52 of a corresponding pixel electrode in the region b is 6.2, the width of the bar-shaped gaps 52 of a corresponding pixel electrode in the region c is 6.4, the width of the bar-shaped gaps 52 of a corresponding pixel electrode in the region d is 6.6, the width of the bar-shaped gaps 52 of a corresponding pixel electrode in the region e is 6.8, the width of the bar-shaped gaps 52 of a corresponding pixel electrode in the region f is 7.0, the width of the bar-shaped gaps 52 of a corresponding pixel electrode in the region g is 7.2, the width of the bar-shaped gaps 52 of a corresponding pixel electrode in the region h is 7.4, the width of the bar-shaped gaps 52 of a corresponding pixel electrode in the region i is 7.6, the width of the bar-shaped gaps 52 of a corresponding pixel electrode in the region j is 7.8, and the width of the bar-shaped gaps 52 of a corresponding pixel electrode in the region k is 8.0. The above width is measured in micrometers.

Moreover, the width differences of the bar-shaped gaps between the region a and the region b, between the region b and the region c, between the region c and the region d, between the region d and the region e, between the region e and the region f, between the region f and the region g, between the region g and the region h, between the region h and the region i, between the region i and the region j, and between the region j and k are all 0.2 micrometers and equal to each other.

It is to be noted that, the first electrode patterns 51 and the bar-shaped gaps 52 in the pixel units 50 corresponding to different regions have the same structure and the same dimensions, according to a preferred embodiment.

Referring further to FIG. 6, the width L of one first electrode pattern 51 in different pixel electrode can be kept the same. In one embodiment, the width L of one first electrode pattern 51 is 4 micrometers. The width S of the bar-shaped gaps 52 is set to 2 micrometers in the middle region (the sum of the width L of the first electrode pattern and the width S of the bar-shaped gaps 52 is 6 micrometers). Each of the side regions C1 and C2 is uniformly divided into 10 regions, and the width S of the bar-shaped gaps 52 in each region increase 0.2 micrometers successively. Thus, the width S of the bar-shaped gaps 52 in the outermost region equals to 4 micrometers (the sum of the width L of the first electrode pattern and the width S of the bar-shaped gaps 52 is 8 micrometers). To achieve the above region distribution, the photomask should be designed correspondingly. After the conventional lithography process, the pixel electrode of the LCD panel could achieve the above distribution. When the width S increases from 2.0 micrometers to 4.0 micrometers, the liquid crystal efficiency θ of the pixel units 50 could be decreased 80% to 90%, that is, the light transmittance ratio of the pixel electrode 50 decreases at 80% to 90%, the "white sides" phenomenon is significantly alleviated.

Referring to FIGS. 3 through 5, each of the pixel units 50 further includes a thin film transistor for driving the pixel electrode, and the thin film transistors of the number of pixel units $P_1, P_2, \ldots, P_X$ have the same structure and dimensions. Each thin film transistor includes a gate electrode $g_1$, a source electrode $s_1$, and a drain electrode $b_1$. The gate electrode $g_1$ is connected to a corresponding gate line 60, the source electrode $s_1$ is connected to a corresponding data line 70, and the drain electrode $b_1$ is connected to a corresponding pixel electrode.

Again, it is to be noted that the above description is only embodiments of the present invention and doesn't limit the scope of the present invention. Any equivalent structure or process transformations, for example, combination of characteristics in different embodiments, or direct or indirect application in other related arts, made from the specification and figures of the present invention, should be included in the scope of the present invention.

What is claimed is:

1. A liquid crystal display (LCD) panel, comprising a plurality of pixel units, wherein each of the plurality of pixel units comprises a pixel electrode, and each pixel electrode comprises a plurality of bar-shaped gaps and a plurality of bar-shaped first electrode patterns, the bar-shaped gaps and the first electrode patterns being alternatively arranged;

along a direction from a middle region of the LCD panel to side regions of the LCD panel, the sum of the area of the bar-shaped gaps in each of the plurality of pixel units increasing gradually while the sum of the area of the first electrode patterns in each of the plurality of pixel units being the same;

along the direction from the middle region of the LCD panel to the side regions of the LCD panel, the width of the bar-shaped gaps in each of the plurality of pixel units increasing gradually, the width of the first electrode patterns in each of the plurality of pixel units being same, and the sum of the width of the first electrode patterns and the bar-shaped gaps in each of the plurality of pixel units increasing gradually;

the plurality of pixel units being connected to corresponding gate lines, data lines, the plurality of pixel units further comprising thin film transistors configured for driving the pixel electrodes, gate electrodes, source electrodes, and drain electrodes of the thin film transistors being connected to the gate lines, the data lines and the pixel electrode, the LCD panel further comprising a gate driver and a source driver, the gate drivers being connected to the gate lines for providing scanning voltage to the plurality of pixel units, the source driver being connected to the data lines for providing driving voltage to the plurality of pixel units.

2. The LCD panel of claim 1, wherein each pixel electrode comprises a first region, a second region, a third region and a fourth region, the first region and the second region are juxtaposed with each other, the third region and the fourth region are arranged at diagonal corners; and the second region and the fourth region are arranged at diagonal corners.

3. The LCD panel of claim 2, wherein the plurality of first electrode patterns in the first region and the plurality of first electrodes patterns in the fourth region extend in a same direction, and the plurality of first electrode patterns in the second region and the plurality of first electrodes patterns in the third region extend in a same direction.

4. The LCD panel of claim 2, wherein the plurality of first electrode patterns in the first region and the plurality of first electrodes patterns in the fourth region extend in a first direction, the plurality of first electrode patterns in the second region and the plurality of first electrodes patterns in the third region extend in a second direction, and the first direction is perpendicular to the second direction.

5. The LCD panel of claim 2, wherein each pixel electrode further comprises a second electrode pattern and a third electrode pattern, the second electrode pattern surrounds the first region, the second region, the third region, and the fourth region therein, and the third electrode pattern is configured for defining the first region, the second region, the third region and the fourth region.

6. A liquid crystal display (LCD) panel, comprising a plurality of pixel units, wherein each of the plurality of pixel units comprises a pixel electrode, and each pixel electrode comprises a plurality of bar-shaped gaps and a plurality of bar-shaped first electrode patterns, the bar-shaped gaps and the first electrode patterns being alternatively arranged;

along a direction from a middle region of the LCD panel to side regions of the LCD panel, the sum of the area of the bar-shaped gaps in each of the plurality of pixel units increasing gradually while the sum of the area of the first electrode patterns in each of the plurality of pixel units being the same.

7. The LCD panel of claim 6, along the direction from the middle region of the LCD panel to the side regions of the LCD panel, the width of the bar-shaped gaps in each of the plurality of pixel units increasing gradually, the width of the first electrode patterns in each of the plurality of pixel units being same, and the sum of the width of the first electrode patterns and the bar-shaped gaps in each of the plurality of pixel units increasing gradually.

8. The LCD panel of claim 7, wherein each pixel electrode comprises a first region, a second region, a third region and a fourth region, the first region and the second region are juxtaposed with each other, the third region and the fourth region are arranged at diagonal corners; and the second region and the fourth region are arranged at diagonal corners.

9. The LCD panel of claim 8, wherein the plurality of first electrode patterns in the first region and the plurality of first electrodes patterns in the fourth region extend in a same direction, and the plurality of first electrode patterns in the second region and the plurality of first electrodes patterns in the third region extend in a same direction.

10. The LCD panel of claim 8, wherein the plurality of first electrode patterns in the first region and the plurality of first electrodes patterns in the fourth region extend in a first direction, the plurality of first electrode patterns in the second region and the plurality of first electrodes patterns in the third region extend in a second direction, and the first direction is perpendicular to the second direction.

11. The LCD panel of claim 8, wherein each pixel electrode further comprises a second electrode pattern and a third electrode pattern, the second electrode pattern surrounds the first region, the second region, the third region, and the fourth region therein, and the third electrode pattern is configured for defining the first region, the second region, the third region and the fourth region.

12. The LCD panel of claim 6, wherein the plurality of pixel units being connected to corresponding gate lines, data lines, the plurality of pixel units further comprising thin film transistors configured for driving the pixel electrodes, gate electrodes, source electrodes, and drain electrodes of the thin film transistors being connected to the gate lines, the data lines and the pixel electrode.

13. The LCD panel of claim 12, wherein the LCD panel further comprises a gate driver and a source driver, the gate drivers being connected to the gate lines for providing scanning voltage to the plurality of pixel units, the source driver being connected to the data lines for providing driving voltage to the plurality of pixel units.

14. An array substrate for a liquid display panel, the array substrate comprising a plurality of pixel units, wherein each of the plurality of pixel units comprises a pixel electrode, and each pixel electrode comprises a plurality of bar-shaped gaps and a plurality of bar-shaped first electrode patterns, the bar-shaped gaps and the first electrode patterns being alternatively arranged;

along a direction from a middle region of the LCD panel to side regions of the LCD panel, the sum of the area of the bar-shaped gaps in each of the plurality of pixel units increasing gradually while the sum of the area of the first electrode patterns in each of the plurality of pixel units being the same.

15. The LCD panel of claim 14, along the direction from the middle region of the LCD panel to the side regions of the LCD panel, the width of the bar-shaped gaps in each of the plurality of pixel units increasing gradually, the width of the first electrode patterns in each of the plurality of pixel units being same, and the sum of the width of the first electrode patterns and the bar-shaped gaps in each of the plurality of pixel units increasing gradually.

16. The LCD panel of claim 15, wherein each pixel electrode comprises a first region, a second region, a third region and a fourth region, the first region and the second region are juxtaposed with each other, the third region and the fourth region are arranged at diagonal corners; and the second region and the fourth region are arranged at diagonal corners.

17. The LCD panel of claim 16, wherein the plurality of first electrode patterns in the first region and the plurality of first electrodes patterns in the fourth region extend in a same direction, and the plurality of first electrode patterns in the second region and the plurality of first electrodes patterns in the third region extend in a same direction.

18. The LCD panel of claim 16, wherein the plurality of first electrode patterns in the first region and the plurality of first electrodes patterns in the fourth region extend in a first direction, the plurality of first electrode patterns in the second region and the plurality of first electrodes patterns in the third region extend in a second direction, and the first direction is perpendicular to the second direction.

19. The LCD panel of claim 16, wherein each pixel electrode further comprises a second electrode pattern and a third electrode pattern, the second electrode pattern surrounds the first region, the second region, the third region, and the fourth region therein, and the third electrode pattern is configured for defining the first region, the second region, the third region and the fourth region.

\* \* \* \* \*